United States Patent [19]

Sengoku et al.

[11] Patent Number: 4,983,414
[45] Date of Patent: Jan. 8, 1991

[54] METHOD OF PRODUCING TOFU-LIKE FOOD

[75] Inventors: Koji Sengoku, Nara; Misako Namba, Ikoma, both of Japan

[73] Assignee: House Food Industrial Company Limited, Higashiosaka, Japan

[21] Appl. No.: 409,294

[22] Filed: Sep. 19, 1989

[30] Foreign Application Priority Data

Sep. 21, 1988 [JP] Japan ................................. 63-237291

[51] Int. Cl.$^5$ ............................................. D23L 1/20
[52] U.S. Cl. ........................................ 426/634; 426/656
[58] Field of Search ................................. 426/634, 656

[56] References Cited

U.S. PATENT DOCUMENTS 4,585,665  4/1986  Sugisawa et al. ................... 426/634

FOREIGN PATENT DOCUMENTS 0118158  6/1985  Japan ................................. 426/634

Primary Examiner—Donald E. Czaja
Assistant Examiner—Helen Pratt
Attorney, Agent, or Firm—Oblon, Spivak, McClelland, Maier & Neustadt

[57] ABSTRACT

A method of producing a tofu-like food such as a soybean curd steak comprises the steps of:
 (A) adding a coagulating agent to a soybean milk and dehydrating the coagulated product;
 (B) mashing the resulting dehydrated product into a paste;
 (C) adding an alkali to said coagulated product before, after or during the mashing thereby adjusting the pH value of said paste to 6.5 or above; and
 (D) subjecting said paste to heat-forming under a condition of pH 6.5 to 7.0. According to this method, there can be prepared a tofu-like food having good texture and elasticity without crumbling.

13 Claims, No Drawings

METHOD OF PRODUCING TOFU-LIKE FOOD

BACKGROUND OF THE INVENTION

1. Field of the Invention

The present invention relates to a method of producing a tofu (soybean curd) like food such as a soybean curd steak.

2. Prior Art

A soybean curd steak is usually produced by seasoning a rather hard soybean curd prepared by filtration through a cotton cloth. The soybean curd steak is cooked by, for example, being fried in an oil before served on the table.

Hitherto, various methods have been proposed for producing soybean curd steak. For instance, Japanese Patent Unexamined Publication (hereinafter, referred to as J. P. Kokai) No. 62-146579 discloses a method which has the steps of boiling soybeans with saturated steam to obtain a soybean milk, adding a coagulating agent to the soybean milk to cause a coagulation so as to obtain soybean curd, pulverizing the coagulated soybean curd into particles and effecting primary dehydration, again pulverizing the primarily dehydrated soybean curd, mixing the soybean curd particles with the additives added as required, conducting secondary dehydration, cutting the soybean curd into a desired size, charging the cut soybean curd together with a filler water in a container and heating the soybean curd, and cooling the soybean curd in the container. Thus, the soybean curd steak is obtained merely by dehydrating, pulverizing the soybean curd into particles and then forming the particles into a steak. The soybean curd steak produced through this method, however, is crumbly and lacks elasticity when eaten after cooking. In addition, this steak tends to be collapsed during cooking.

On the other hand, J. P, Kokai No. 59-45847 discloses a food prepared by coagulating a soybean milk. More specifically, this method has the steps of press-filtering a coagulated product of a soybean milk so as to reduce the water content to 50 to 80%, forming the press-filtered product into a definite form, immersing the formed product in a diluted aqueous solution of alkali carbonate, draining the formed product, and coating the surface of the formed product with starch, whereby the texture and pleasantness to palate are improved. According to this method, the coagulated soybean milk is merely press-filtered but not mashed. In addition, the coagulated product is contacted with the diluted aqueous solution of alkali carbonate only at its surface. In consequence, the food produced by this method is still unsatisfactory in that the core portion of this food is crumbly and not elastic.

SUMMARY OF THE INVENTION

Accordingly, an object of the present invention is to provide a tofu-like food such as a soybean curd steak which is not crumbly but has good texture or elasticity.

The present invention is based upon a discovery that the above-described object has been accomplished by a method in which a dehydrated coagulated soybean milk is mashed and an alkali agent is added to adjust the mashed product to a specific pH value, and then forming and heating the mashed product.

According to the present invention, there is provided a method of producing a tofu-like food comprising the steps of:

(A) adding a coagulating agent to a soybean milk and dehydrating the coagulated product;
(B) mashing the dehydrated product into a paste;
(C) adding an alkali to the coagulated product before, after or during the mashing thereby adjusting the pH value of the paste to 6.5 or above; and
(D) subjecting the paste to heat-forming under a condition of pH 6.5 to 7.0.

DESCRIPTION OF THE PREFERRED EMBODIMENTS

According to the invention, a coagulating agent is added to a soybean milk so as to obtain a coagulated milk and then the coagulated milk is dehydrated (Step (A)).

The coagulated soybean milk can be obtained through a conventional soybean curd production process which has the steps of grinding soybeans, heating the ground soybeans, separating lees of soybean (okara), and coagulating soybean milk by addition of a coagulating agent.

Instead of the soybeans as the starting material, it is possible to use a soybean milk which is prepared by spray-drying defatted soybean extract liquid into a powder, and adding water to the powder.

In order that the tofu-like food imparts moderate elasticity to palate, the soybean solid content of the soybean milk preferably ranges between 5 and 15 weight percents (abbreviated as % hereinafter), more preferably 6 and 12%. In other words, the water content of the soybean milk is preferably between 95 and 85%, more preferably between 94 and 88%. Usually, the soybean solid content in coagulated soybean milk ranges between 4 and 10% and has pH value around 6.0, so that it is preferred that the conditions are selected to provide a higher coagulation effect than those of conventional process for preparing tofu. In this case, delta-gluconic lactone, calcium chloride or other coagulating agent having strong solidification effect is used preferably, although other coagulating agents such a magnesium chloride and calcium sulfate can be used.

Only one kind of coagulating agent may be used or a mixture of two or more kinds of coagulating agents can be used. The content of the coagulating agent in the soybean milk preferably ranges between 0.2 and 0.6 %, more preferably between 0.25 and 0.35%. When the content of the coagulating agent is below 0.2%, coagulation effect is too small to impart elasticity to the tofu-like food. On the other hand, addition of the coagulating agent in excess of 0.6% tends to adversely affect the taste of the food product. It is thus possible to impart pleasant texture with moderate elasticity to the tofu-like food, by adding a coagulating agent in an amount falling within the above-mentioned range. The coagulation is preferably conducted at a temperature between 70 and 95° C. for 10 to 60 minutes.

The coagulated milk is then dehydrated by means of a pressing machine or a centrifugal separator. The dehydration is conducted in such that the water content of the coagulated soybean milk is reduced to 70 to 80%, preferably 73 to 77%. When the water content of the coagulated soybean milk is below 70%, the tofu-like food is rather dry and tends to become crumbly. On the other hand, a water content exceeding 80% tends to make the product too soft, failing to meet the requirement for moderate elasticity. It is thus possible to obtain a tofu-like food having a texture with a moderate level of elasticity and without any crumbling feel.

Dehydration of the coagulated soybean milk by press filtration can be effected satisfactorily when the filtration is conducted by progressively increasing the pressure from about 0.1 kg/cm$^2$ to 1.5 kg/cm$^2$ in 15 to 60 minutes. This control of pressure is also advantageous from the view points of prevention of clogging of the filter cloth and exudation of coagulated content from the filter cloth.

According to the invention, the dehydrated coagulated soybean milk is mashed (Step (B)).

The term "mash" is used to mean mashing or uniformalizing the coagulated product to change it into a paste, i.e., to change the product into fine particles. The mashing can be effected by means of, for example, a high-speed cutter or a colloid mill.

According to the present invention, an alkali agent is added to the coagulated product before, after or during mashing, so as to adjust the pH value to 6.5 or above (Step (C)).

The alkali agent thus added increases the hydration property of the coagulated product which has been mashed into fine particles. The paste is then formed in a predetermined shape and heated to obtain a tofu-like food having a smooth texture and exhibiting good taste with moderate elasticity and without crumble.

According to the present invention, the alkali agent is preferably added during the mashing in such that the alkali agent can uniformly act on the coagulated product.

Examples of the alkali agent suitably used are caustic soda (NaOH), sodium carbonate (Na$_2$CO$_3$) and sodium hydrocarbonate (NaHCO$_3$). The alkali agent such as caustic soda is preferably added in the form of an aqueous solution so that the alkali agent is uniformly distributed to ensure a uniform texture of the tofu-like food. Addition of alkali agent in the form of an aqueous solution is also advantageous from the view point of shortening of the treating time.

The alkali agent is added so as to adjust the pH value to 6.5 or above. When the pH value of the paste is below 6.5, the texture of the tofu-like food tends to become crumbly due to inferior hydration property of the coagulated particles. Preferably, the addition of the alkali agent is conducted in such that the pH value of the paste does not exceed 9.0 so as not to adversely affect the taste of the tofu-like food. By adjusting the pH value to the above-specified range, it is possible to enhance the hydration property of the coagulated particles so as to provide a texture with increased elasticity and improved taste.

According to the invention, the paste after addition of the alkali agent may be kneaded so that the alkali agent uniformly works to the entire portion of the coagulated product, thus realizing a uniform texture of the tofu-like food. Since it is sufficient in the present invention that the pH value is set to 6.5 or above as a result of addition of the alkali agent, it is possible to leave the paste for a period of 20 to 120 minutes after the adjustment of the pH value to the above-mentioned range. Thereby, it is possible to further improve the hydration property of the fine particles of the coagulated product and therefore, the texture of the tofu-like food becomes further smooth and the taste of the same is further improved.

The pH value of the paste has to be maintained at 6.5 or above until the next heat-forming step is executed after the alkali treatment. If the pH value is reduced to lower than 6.5, the coagulation of the paste starts in advance of the heat-forming, so that a tofu-like food produced from such a paste undesirably exhibits non-uniform texture and crumbly feel without any elasticity when eaten.

According to the invention, the paste is heat-formed by an ordinary method at pH 6.5 to 7.0, followed by coagulation. (Step (D))

The paste of the above-specified pH value is charged in a forming vessel such as a tray, pouch or a casing, and is heated by a suitable heating medium such as boiled water and steam, whereby the paste is shaped into a predetermined form.

The heating is preferably conducted at a temperature of not lower than 80° C., more preferably between 90 and 135° C., and the heating time is preferably 60 to 10 minutes. The above-mentioned paste is efficiently shaped by heating under the above-mentioned heating conditions, whereby a tofu-like food having a good texture with good elasticity can be obtained. A tofu-like food which is capable of being stored by chilled-storage method can be obtained by conducting the heating for 60 to 40 minutes at 90 to 110° C. A tofu-like food which is capable of being stored at normal temperature can be obtained by conducting the heating for 40 to 10 minutes at 110 to 135° C.

The heat-forming is conducted while the pH value of the paste is maintained between 6.5 and 7.0. If the pH value has been reduced down below 6.5, the coagulation of the paste will start in advance of the commencement of the heating, so that the tofu-like food produced from this paste undesirably has non-uniform texture. On the other hand, a pH value exceeding 7.0 tends to hamper coagulation of the paste so that the tofu-like food tends to become non-elastic. It is therefore possible to obtain a tofu-like food having a highly smooth texture and exhibiting a taste with good elasticity, by conducting the heat-forming step while maintaining the pH value of the taste between 6.5 and 7.0.

When a pH value of the paste is adjusted between about 6.5 and 7.0 in the step (C), the paste can be directly formed and heated to become a tofu-like food (Embodiment 1). However, when the pH value of the paste is over 7.0 by addition of an alkali agent, a suitable treatment is conducted to adjust the pH value between 6.5 and 7.0 at the time of the heat-forming, and the heat-forming is then conducted while the pH value of the paste is maintained within such a range (Embodiment 2).

The embodiment 2 has an advantage that the hydration property of the particles of the coagulated product improves, and thereby, there is obtained the tofu-like food having a smooth texture and increased elasticity. For this reason, the embodiment 2 is preferred more than the embodiment 1.

In the embodiment 2, the pH value of the paste which has exceeded 7.0 is reduced again to a value between 6.5 and 7.0 for the heat-forming. The reduction of the pH value can be conducted by adding delta-gluconic lactone so as to reduce the pH value to the above-mentioned range by use of the heat applied during heat-forming. Alternatively, the pH value of the paste is reduced to fall within the above-mentioned range by addition of, for example, an organic acid and then the heat-forming step is executed.

The tofu-like food produced by the above-described method has a water content of about 70 to 80%. The seasoning of the tofu-like food can be effected by adding a seasoning such as table salt, salad oil and sugar, or materials such as vegetable and meat, to the coagulated product at an intermediate stage of the process between mashing and heat-forming.

The tofu-like food produced by the method of the present invention can be served on table through cooking such as frying in an oil, roasting and so forth. This food has a smooth texture and exhibits a taste with high degree of elasticity without crumble. In addition, this food exhibits a taste inherent to the soybeans and has a strength enough to avoid collapsing during cooking. In consequence, the food maintains its shape when served on a table. Therefore, according to the present invention, there is provided a tofu-like product having superior taste and the product can be prepared at a reduced cost, compared with conventional tofu-like steak making use of soybean protein.

The invention is explained with reference to the following non-limitative examples.

EXAMPLE 1

Soybeans were ground by a known method and heated and then lees of soybean (okara) were separated from the ground soybeans to obtain a soybean milk. Then, 4.4 g of delta-gluconic lactone was added to 2 kg of the soybean milk and the soybean milk was left to stand at 80° C. for about 30 minutes, whereby coagulated soybean milk was obtained. The soybean solid content and the pH of the soybean milk were 8% and 6.0, respectively.

The coagulated product was then press-filtered by a pressing machine at a pressure of 0.2 to 1.0 kg/cm$^2$ for about 30 minutes, so that the coagulated product was dehydrated to reduce its water content to 73%. Then, 0.5 kg of the dehydrated coagulated product was mashed by a high-speed cutter so as to be changed into a paste. Then, 16 g of aqueous solution of caustic soda was added to the paste and the paste was kneaded so that the paste exhibited a pH value 7.0, and the paste was held in this state for about 30 minutes. The paste was then charged in a tray used as the forming vessel and was heated by a retort at 121° C. for 20 minutes, so that the paste was formed into a tofu-like food.

After seasoning with salt and pepper and frying in an oil, the food was served on a table so as to be eaten. A smooth texture, as well as good taste with high elasticity and without crumble, was confirmed.

EXAMPLE 2

A coagulated soybean milk prepared by the same process as Example 1 was mashed into a paste. Then, 59g of an aqueous solution of caustic soda was added to 0.5 kg of the paste and mixed each other. The mixed paste having pH value of 9.0 was then left to stand for about 30 minutes. Subsequently, 3.4 g of delta-gluconic lactone was added to the paste and the mixture of the paste was charged in a tray used as the forming vessel. The paste was then formed into a tofu-like food by being heated at 121° C. for 20 minutes by means of a retort. As a result of addition of delta-gluconic lactone, the pH value of the paste was reduced to about 7.0 during the paste is subjected to the heat-forming.

After seasoning thus obtained tofu-like food with salt and pepper and frying in an oil, the food was served on a table so as to be eaten. A smooth texture, as well as good taste with high elasticity and without crumble, was confirmed.

EXAMPLE 3

A tofu-like food was obtained by the same process as Example 1 except that 9 g of aqueous solution of caustic soda was added to the paste after the mashing so as to adjust the pH value of the paste to 6.5.

EXAMPLE 4

A tofu-like food was produced by the same process as Example 2, except that 66g of aqueous solution of caustic soda was added to the paste after the mashing to adjust the pH value of the paste to 9.5 and that, after the paste was left in this state for 30 minutes, 4.3 g of delta-gluconic lactone was added to reduce the p( of the paste to about 7.0 during the paste is subjected to heat-forming.

COMPARISON EXAMPLE 1

A coagulated soybean milk was obtained and press-filtered by the same method as Example 1, and the press-filtered coagulated soybean milk was subjected to mixing conducted with a mixer. The mixed coagulated product of pH 6.0 was then charged in a tray and was formed into a tofu-like food by being heated for 20 minutes at 121° C. by means of a retort.

COMPARISON EXAMPLE 2

A tofu-like food was prepared by the same process as Example 1 except that the addition of the aqueous solution of caustic soda to the mashed paste and the subsequent mixing were omitted. (The pH of the paste was 6.0).

COMPARISON EXAMPLE 3

A tofu-like food was produced substantially in the same process as Example 2. In this case, however, the pH of the mashed paste was adjusted to 9.0 by addition of 52g of the caustic soda and, after the paste was left in this state for 30 minutes, 2.7 g of delta-gluconic lactone was added to the paste followed by mixing. (The pH of the paste was reduced to about 7.5 during the heat-forming.)

The tofu-like foods of Examples 1 to 4 and Comparison Examples 1 to 3 were seasoned with salt and pepper and fried in an oil, and served on a table for evaluation, the results of which are shown in Table 1.

The elasticity appearing in the column of property was determined by the following method.

MEASUREMENT OF ELASTICITY

Each tofu-like food was sliced into pieces of 15 mm thick, thus obtaining test pieces of all samples. Each sample was charged in a Reo meter produced by Fudo Kogyo Kabushiki Kaisha. In the test, a plunger of 8 mm diameter was forced into the test piece to a predetermined depth. Then, the change in the stress was measured after keeping the plunger at this position for a predetermined period, and the elasticity of the test piece of each tofu-like food was determined in accordance with the following formula.

Elasticity=[(Stress measured at 30 seconds after peak stress observed when plunger is initially inserted into test piece)/ (Peak stress observed when plunger is initially inserted into test piece)]×100%

The greater the value calculated by the formula, the higher the elasticity of the tofu-like food.

TABLE 1

| | Treating Condition pH | | Product Evaluation | | |
|---|---|---|---|---|---|
| | Alkali treatment | Heat-forming | Properties Appearance of cut surface | elasticity | Taste Sensory |
| Example 1 | 7.0 | 7.0 | Very smooth | 58 | Very soft and smooth to palate. Good melting and elasticity |
| Example 2 | 9.0 | 7.0 | The same as above | 64 | The same as above |
| Example 3 | 6.5 | 6.5 | The same as above | 55 | Soft and smooth to palate. Good melting and elasticity |
| Example 4 | 9.5 | 7.0 | The same as above | 67 | Soft, good melting and elasticity, but slight sulfur smell was felt |
| Comp. Ex. 1 (No mashing) | 6.0 | 6.0 | Rough due to presence of coarse particles | 43 | Inferior taste due to crumbling and non-elastic feel |
| Comp. Ex. 2 (With mashing) | 6.0 | 6.0 | Rough due to presence of fine particles | 48 | Crumbling and non-elastic |
| Comp. Ex. 3 | 9.0 | 7.5 | Very smooth | 47 | Fluidic like a paste |

What is claimed is:

1. A method of producing a tofu-like food consisting essentially of the steps of:
   (A) adding a coagulating agent to a soybean milk and dehydrating the coagulated product;
   (B) mashing the resulting dehydrated product into a paste;
   (C) adding an alkali to said coagulated product before, after or during the mashing thereby adjusting the pH value of said paste to 6.5 or above; and
   (D) subjecting said paste to heat-forming under a condition of pH 6.5 to 7.0.

2. A method of claim 1 wherein a solid content of the soybean milk in Step (A) is 5 to 15 wt %.

3. A method of claim 1 wherein the coagulating agent is added to the soybean milk in an amount of 0.2 to 0.6 wt %.

4. A method of claim 1 wherein a coagulation in step (A) is carried out at a temperature of 70 to 95° C. for 10 to 60 minutes.

5. A method of claim 1 wherein the dehydration of step (A) is carried out in such that a water content of the coagulated product is reduced to 70–80 wt %.

6. A method of claim 1 wherein the dehydration in step (A) is carried out by progressively increasing the pressure from about 0.1 kg/cm$^2$ to 1.5 kg/cm$^2$ for 15 to 60 minutes.

7. A method of claim 1 wherein the alkali agent is added to the coagulated product to adjust pH of the paste to 6.5–9.0 in step (C).

8. A method of claim 1 wherein the alkali agent is added to the coagulated product to adjust pH of the paste to 6.5–7.0 in step (C).

9. A method of claim 1 wherein the alkali agent is added to the coagulated product to adjust pH of the paste to higher than 7.0 and not higher than 9.0 in step (C), and then the pH is adjusted to 6.5–7.0 before step (D).

10. A method of claim 9 wherein the pH is adjusted to 6.5–7.0 by adding delta-gluconic lactone to the paste.

11. A method of claim 1 wherein the heat-forming of step (D) is conducted at a temperature of not lower than 80° C.

12. A method of claim 1 wherein the heat-forming of step (D) is conducted at a temperature of 90 to 135° C. for 60 to 10 minutes.

13. A method of claim 1 wherein the paste is left to stand for 20 to 120 minutes after addition of alkali of step (C).

* * * * *